United States Patent

[11] 3,595,455

| [72] | Inventor | Clifford Pace<br>Chester, Pa. |
|---|---|---|
| [21] | Appl. No. | 817,024 |
| [22] | Filed | Apr. 17, 1969 |
| [45] | Patented | July 27, 1971 |
| [73] | Assignee | Gulf & Western Industrial Proudcts Company<br>Grand Rapids, Mich. |

[54] METHOD AND APPARATUS FOR SHEARING METAL PLATE MATERIAL
8 Claims, 5 Drawing Figs.

[52] U.S. Cl. ................................................ 225/3,
  83/13, 83/495, 83/675, 225/97, 225/103
[51] Int. Cl. .................................................... B26f 3/00,
  B23d 19/04
[50] Field of Search........................................... 83/13, 51,
  495, 496, 497, 492, 493, 494, 425, 675, 503;
  225/3, 2, 95, 96, 97, 103, 98, 93

[56]         References Cited
         UNITED STATES PATENTS

| 1,989,136 | 1/1935 | Geggus........................ | 83/492 |
| 2,109,921 | 3/1938 | Leach........................... | 83/495 X |
| 3,138,049 | 6/1964 | Flory et al.................... | 83/495 X |
| 3,312,135 | 4/1967 | Mraz............................ | 83/675 |
|           | FOREIGN PATENTS | | |
| 261,134   | 6/1915 | Germany...................... | 83/495 |
| 425,900   | 3/1935 | Great Britain................ | 83/497 |

Primary Examiner—Frank T. Yost
Attorney—Meyer, Tilberry and Body

ABSTRACT: A method and apparatus for shearing heavy metal plate by the use of cooperating rotary cutting discs which have diameters which differ by a predetermined ratio or by the use of cutting discs of substantially equal diameters but driven at different velocities.

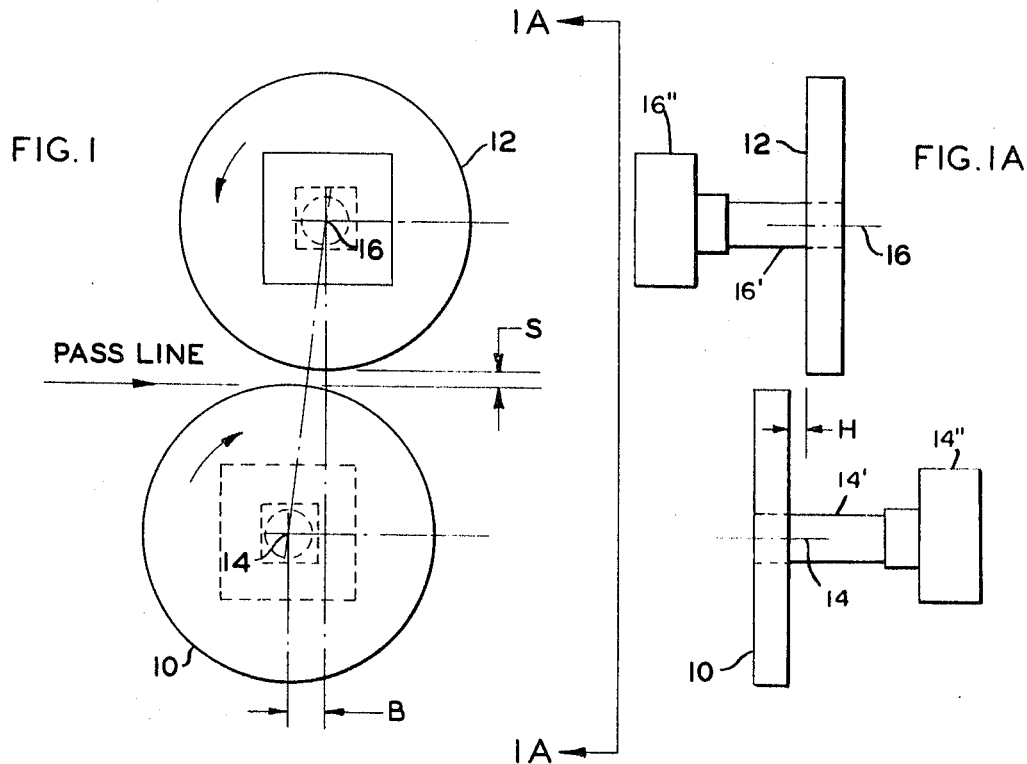
FIG. 1
FIG. 1A
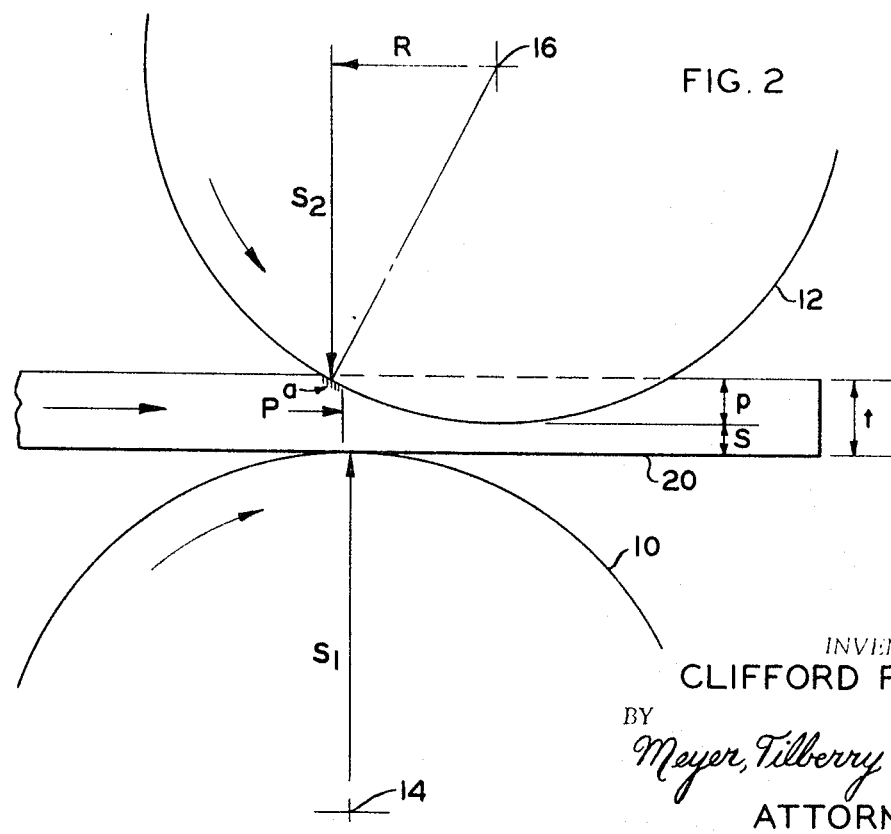
FIG. 2
INVENTOR.
CLIFFORD PACE
BY
Meyer, Tilberry & Body
ATTORNEYS.

METHOD AND APPARATUS FOR SHEARING METAL PLATE MATERIAL

The preset invention is directed toward the cutting art and, more particularly, to an improved method and apparatus for shearing metal plate of substantial thickness by the use of rotary cutters.

The invention is particularly suited for use in edge trimming steel plate in the range of from three-eighth inch to 2 inches in thickness and will be described with particular reference thereto; however, it will be appreciated that the invention is capable of broader application and could be used for shearing metal plate or sheets of many types and thicknesses.

Several different approaches have been used in an attempt to shear or edge trim heavy gauge steel plate. These attempts have included pregrooving the plate along the cut line so that the thickness which must be sheared is substantially reduced; using rotary cutting discs of greatly different diameters e.g. the upper disc of a diameter only one-third or less than that of the lower disc; using reciprocated cutting blades which proceed along the plate edge in discrete increments; and, using rotary cutting discs set so as to have a predetermined work entry angle (i.e. the angle made by the intersection of a line passing through the centerlines of the cutting discs, and the pass line of the material being sheared) and predetermined lateral and vertical spacings.

Of the above approaches, the most satisfactory to date has been the last. It has been found that closely controlling the noted angle and the lateral and vertical blade spacings, it is possible to produce an excellent edge on extremely thick plate e.g. in a range above 1 inch in thickness. One apparatus which is especially suited for carrying out this particular method is described and claimed in the commonly assigned, copending application Ser. No. 631,955, filed Apr. 19, 1967, in the name of Valone V. Weyant.

The subject invention provides a method and apparatus which is an improvement to the basic method mentioned above. In particular, it has been found that improved cutting can be achieved if the cutting discs have diameters which are of a predetermined relative ratio or, alternately, if the cutting discs are driven at slightly different relative velocities.

Accordingly, the primary object of the present invention is the provision of a method and apparatus whereby it is possible to shear thick metal plate in a manner which produces a more satisfactory cut edge.

Another object is the provision of a method of shearing heavy plate in a manner which reduces the required power input when compared with prior methods.

Yet another object is the provision of a method and apparatus by which rotary cutting discs can be used to edge trim heavy steel plate without damaging the trimmed plate.

These and other objects and advantages will become apparent from the following description when read in conjunction with the accompanying drawings wherein:

FIG. 1 is a side elevation of a pair of cutting knives or discs as they are typically positioned for shearing heavy plate;

FIG. 1A is a front elevation looking in the direction toward the incoming work;

FIG. 2 is a partial side elevation showing force and velocity relationships between the cutting discs and the workpiece;

Referring more particularly to the drawings wherein the showings are for the purpose of illustrating and explaining the preferred embodiment of the invention, and not for limiting same, FIGS. 1 and 1A show the normal positional relationship between a pair of rotary cutting discs 10 and 12 arranged for shearing relatively thick sheet or plate. As best shown in FIG. 1A, the discs are conveniently mounted by known means in juxtaposed relationship for rotation about respective horizontal axes 14 and 16 by shafts 14' and 16'. The shafts 14' and 16' may be driven at varying speeds by motor-drive units of known types which are schematically designated as 14" and 16". The details of the mounting and drive arrangement provided for the discs is not of particular importance to the invention and could, for example, be as shown in the commonly assigned copending application Ser. No. 631,955, filed Apr. 19, 1967, in the name of Valone V. Weyant, which is incorporated herein by reference.

As is well known, there are generally considered to be three settings which must be made to assure satisfactory operation when shearing heavy gauge metal plate. These three settings are:

1. The horizontal distance H (See FIG. 1A) between the disc;
2. The vertical distance S (See FIG. 1) between the discs outer peripheries; and,
3. The horizontal distance B (See FIG. 1) between the discs vertical centerlines (Sometimes described in terms of the "work entry angle" i.e. the angle $\alpha$ between the intersection of a line passing through the axes of the discs and the pass line).

Figure 3:
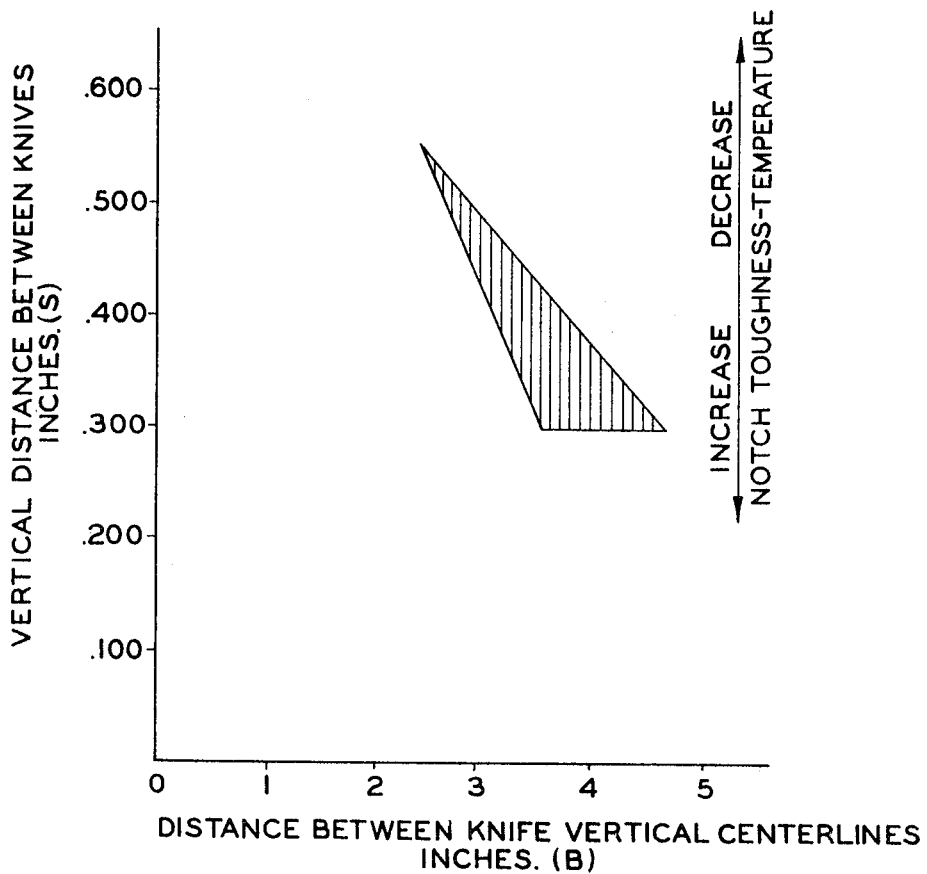
FIG. 3 is a diagram showing preferred rotary blade settings.

The three above-noted settings are influenced by the thickness of the metal plate being sheared, the metals temperature, and its notch toughness. Manufacturer's of rotary discs or knives normally supply the necessary setting information for their particular discs. However, merely by way of example, the generally accepted formula for determining the horizontal distance H is that it is preferably in the range the tangent of 7° times the plate thickness i.e. $H = \text{Tan } 7° \times$ plate thickness. Similarly, recommended settings for the vertical distance V and the horizontal distance B is available from information published by disc manufactures. FIG. 3 is a graph showing a typical range of settings for 42-inch diameter discs shearing 1-inch thick plate. The approximate acceptable range of setting values is that enclosed within the crosshatched envelope, with the most ideal point depending upon the materials notch toughness and temperature. Note that as temperature and or notch toughness increase, the preferred setting is at a lower point within the envelope.

The following chart further shows preferred settings for discs in the range of 40 inches in diameter.

RECOMMENDED ROTARY KNIFE SETTING

| | Preferred range | | | |
|---|---|---|---|---|
| | Dim. H (tan 7° × pl. thk.) | Dim S Max. | Dim S Min. | Dim B |
| Plate thk. (in.): | | | | |
| .375 | .047 | .206 | .125 | 1.50 |
| .500 | .063 | .275 | .166 | 1.87 |
| .625 | .078 | .343 | .208 | 2.00 |
| .750 | .094 | .412 | .250 | 2.25 |
| .875 | .110 | .480 | .290 | 2.60 |
| 1.000 | .125 | .550 | .330 | 3.00 |
| 1.125 | .140 | .618 | .371 | 3.25 |
| 1.250 | .155 | .687 | .412 | 3.50 |

Prior to the subject invention, the above-described approach to shearing heavy plate with rotary discs has been the most acceptable. The subject inventor, however, has found that by modification of the above approach substantial improvements in quality of cut edge, as well as, reduction in power input.

To clearly understand the subject invention, the reaction of the material as it passes between the cutting discs should be understood. Referring to FIG. 2, it is seen that as the plate 20 passes between the discs, the plate rides upon the lower disc 10 while the top disc 12 penetrates into the plate a distance $p$ which is, of course, equal to the thickness of the plate less the vertical spacing S. The line P represents the propagating shear line i.e. the line at which shearing of the plate takes place. Consequently, the upper blade is drivingly engaged with the plate throughout the small area labeled $a$. The lines $S_1$ and $S_2$ represent the vertical vectors of the actual forces applied to the plate, and line R is the horizontal vector of the force applied by the upper blade and indicates the force resisting shear drive.

Figure 4:
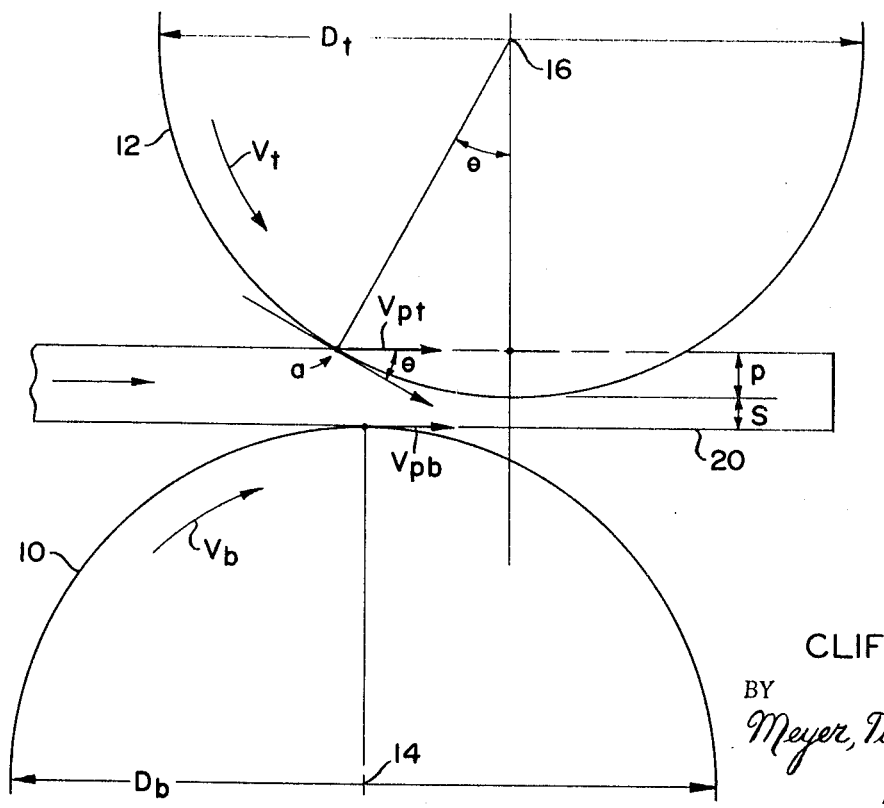
FIG. 4 is a partial side elevation showing certain of the relationships between the workpiece and the cutting discs which determine the preferred disc velocity relationships according to the invention.

If the discs are the same diameter, as is customary, it can be shown from the above that during shearing, the bottom disc must slip against the bottom of the plate or, alternately, pull the plate against the top disc with such force that, for an instant, the mechanical action is equivalent to pulling the plate and holding the top disc stationary. This can be shown by the following example with reference to FIG. 4. Assuming that the diameter $D_t$ of the top disc equals the diameter $D_b$ of the bottom disc, and that both discs are driven at equal circumferential velocities $V_t$ and $V_b$ respectively then the following occurs:

1. The bottom disc attempts to impart a horizontal component of velocity $V_{pb}$ to the plate equal to the circumferential velocity $V_b$ of the top disc in revolutions per minute times $\pi D_b$. That is, $V_{pb} = V_b \pi D_b$.

2. The top disc attempts to impart a horizontal component of plate velocity $V_{pt}$ to the plate equal to the circumferential velocity $v_t$ of the top disc times $\pi D_t \cos \theta$, where $\theta$ is the angle between the vertical centerline of the top disc and a line from the disc center through the contact area $a$. That is, $V_{pt} = V_t \pi D_t \cos \theta$ 3. The resulting relationship between $V_{pb}$ and $V_{pt}$ can be obtained, by setting the two above equations equal to unity i.e.

$$1 = \frac{V_b \pi D_b}{V_{pb}} \text{ and}$$

$$1 = \frac{V_t \pi D_t \cos \theta}{V_{pt}}$$

therefore, (A) $$\frac{V_b \pi D_b}{V_{pb}} = \frac{V_t \pi D_t \cos \theta}{V_{pt}}$$

recalling that $D_b = D_t$ and $V_b = V_t$, the equation can be simplified to $$\frac{1}{V_{pb}} = \frac{\cos \theta}{V_{pt}}$$

or $V_{pt} = V_{pb} \cos \theta$

Consequently, it can be seen that there must be slippage between one of the discs and the workpiece. Normally this will occur between the plate and the lower disc resulting in undesirable marking of the plate.

According to the subject invention the above problem is overcome by driving the two discs at slightly different speeds or, alternately, making the discs of slightly different diameters. Note that if the ratio of disc diameters or disc circumferential velocities is correct, the horizontal velocities which each disc attempts to impart to the plate will be equal. The proper ratio can be determined by use of equation A above and setting $V_{pb} = V_{pt}$, which is zero slippage. i.e., $V_b \pi D_b = V_t \pi D_t \cos \theta$ (B) or $$\frac{V_b \cdot D_b}{V_t \cdot D_t} = \cos \theta$$

Referring again to FIG. 4, it will be noted that $$\cos \theta = \frac{\text{Top disc radius} - \text{Top disc penetration}}{\text{Top disc radius}}$$

and, referring to FIG. 2, Top Disc Penetration $p$ is equal to plate thickness $t$ less the blade spacing $S$ or $p = t - S$. therefore, $$\cos \theta = \frac{\frac{D_t}{2} - (t - S)}{\frac{D_t}{2}}$$

or $$\cos \theta = \frac{D_t - 2(t - S)}{D_t}$$

Substituting this value for $\cos \theta$ into equation B we get a generic formula for producing zero slippage:

$$\frac{V_b \cdot D_b}{V_t \cdot D_t} = \frac{D_t - 2(t - S)}{D_t}$$

Setting $V_b = V_t$, we can determine the proper relationship for $D_b$ and $D_t$ to produce zero slippage with equal drive velocities, namely:

$$\frac{D_b}{D_t} = \frac{D_t - 2(t - S)}{D_t}$$

I. or $D_b = D_t - 2(t - S)$

Setting $D_b = D_t$ the proper drive speed relationship to produce zero slippage with equal disc diameters can be determined, that is, $$\frac{V_b}{V_t} = \frac{D_t - 2(t - S)}{D_t}$$

or

II. $$V_b = V_t \left[ \frac{D_t - 2(t - S)}{D_t} \right]$$

From the above it is possible to readily design or operate the cutting apparatus to completely eliminate slippage between the workpiece and the cutting disc. This has been found to reduce the power consumption and simultaneously produce a better edge cut.

The invention has been described in great detail sufficient to permit one of ordinary skill in the cutting art to make and use the same. Modifications and alterations of the preferred embodiment will occur to others upon reading and understanding of this specification and it is my intention to include all such modifications and alterations as part of my invention insofar as they come within the scope of the appended claims.

Having thus described my invention, I claim:

1. The method of shearing metal plate comprising the steps of:
   a. providing first and second rotary cutting discs having diameters $D_t$ and $D_b$ respectively;
   b. positioning the discs with their axes of rotation extending generally horizontally and horizontally offset relation to one another and the first disc being positioned above and spaced so that its outer periphery is a distance $S$ from the outer periphery of the second disc;
   c. rotating said first disc at a velocity $V_t$ and rotating said second disc in the opposite direction at a velocity $V_b$;
   d. passing metal plate of thickness $t$ between said discs and maintaining zero slippage between said plate and discs during shearing of said plate by maintaining the following relationships;
      1. $S$ approximately equal to between 0.5 and 0.8 times $t$; and,
      2. $\frac{V_b \cdot D_b}{V_t \cdot D_t}$ approximately equal to $\frac{D_t - 2(t - S)}{D_t}$ 2. The method as defined in claim 1 wherein $V_t$ is maintained equal to $V_b$.

3. The method as defined in claim 1 wherein $D_t$ is equal to $D_b$.

4. The method as defined in claim 1 wherein $t$ is in the range of three-eighth inch to 2 inches.

5. The method as defined in claim 1 wherein $S$ is equal to approximately 0.65 times $t$.

6. In apparatus for shearing metal plate of thickness $t$ comprising first and second horizontally offset rotary cutting discs having diameters $D_t$ and $D_b$ respectively, said first disc above said second disc with their axes extending horizontal and their outer peripheries spaced a distance $S$, which is in the range of 0.5 to 0.8 times $t$ and means for rotating said discs in opposite directions at velocities $V_t$ and $V_b$ respectively: the improvement wherein the diameter $D_b$ is varied so that $$\frac{V_b \cdot D_b}{V_t \cdot D_t}$$

is approximately equal to $$\frac{D_t - 2(t - S)}{D_t}$$

, whereby zero slippage is maintained between said discs and plate during shearing of said plate.

7. The improvement as defined in claim 6 wherein $D_t$ is equal to $D_b$.

8. The improvement as defined in claim 7 wherein $V_b$ is equal to $V_t$.